United States Patent [19]

Terry et al.

[11] Patent Number: 5,203,210

[45] Date of Patent: Apr. 20, 1993

[54] ACCELEROMETER WITH FASTENER ISOLATION

[75] Inventors: Thomas E. Terry, Vashon; Damon R. Stoddard, Seattle, both of Wash.

[73] Assignee: Sundstrand Corporation, Rockford, Ill.

[21] Appl. No.: 713,752

[22] Filed: Jun. 11, 1991

[51] Int. Cl.$^5$ .................. G01P 15/02; G01P 15/13
[52] U.S. Cl. .................. 73/517 B; 73/514
[58] Field of Search ............ 73/517 B, 514, 517 R, 73/526

[56] References Cited

U.S. PATENT DOCUMENTS

| | | | |
|---|---|---|---|
| 3,339,419 | 9/1967 | Wilcox | 73/517 B |
| 4,658,647 | 4/1987 | Shintani et al. | 73/517 B |
| 4,811,604 | 3/1989 | Browning | 73/526 |

Primary Examiner—John E. Chapman
Attorney, Agent, or Firm—Fitch, Even, Tabin & Flannery

[57] ABSTRACT

An accelerometer that includes a proof mass assembly comprising a paddle flexurally mounted to a support, a sensing circuit for detecting movement of the paddle, and a force rebalance system. The sensing circuit includes a capacitor plate positioned on a surface of the paddle. The proof mass assembly is clamped between upper and lower mounting pieces positioned on opposite sides of the proof mass assembly from one another. One or more fasteners extend between the upper and lower mounting pieces through the proof mass assembly. The support is shaped so as to form openings through which the fasteners pass, such that the support isolates each fastener from the paddle. This arrangement isolates the paddle from a source of contamination, provides for a more evenly distributed clamping force, and minimizes distortion of the mounting pieces. The fastener openings in the support may be shaped so as to limit movement of the paddle towards the flexures.

10 Claims, 4 Drawing Sheets

ACCELEROMETER WITH FASTENER ISOLATION

TECHNICAL FIELD

The present invention relates to accelerometers in which a mass is suspended from a support for movement along a sensing axis.

BACKGROUND OF THE INVENTION

One type of prior art accelerometer comprises a paddle that is suspended by flexures from a support ring that surrounds the paddle. The paddle can pivot with respect to the support ring about a hinge axis that passes through the flexures. The combination of the paddle, flexures and support ring is referred to as a proof mass assembly, and may be fabricated as a unitary structure from fused quartz. The proof mass assembly is positioned between upper and lower mounting members that clamp the support ring between them, but leave the paddle free to pivot about the hinge axis.

The accelerometer includes a sensing circuit for sensing the rotational position of the paddle, and a force rebalance circuit for exerting a force on the paddle. In one type of sensing circuit, a first capacitor plate is formed on one surface of the paddle, and a second capacitor plate is formed on the adjacent mounting member. The sensing circuit measures the capacitance between these plates, to thereby determine the paddle position with respect to the mounting member. One well-known type of force rebalance circuit comprises a coil mounted to the paddle, and a magnet formed in the adjacent mounting member. When a current is passed through the coil, the current interacts with the magnetic field of the magnet to produce a force on the paddle.

In operation, the accelerometer is affixed to an object whose acceleration is to be measured. Acceleration of the object along a sensing axis normal to the paddle results in rotation of the paddle about the hinge axis with respect to the support ring and mounting members. The resulting capacitance change caused by this movement is sensed by a feedback circuit. In response, the feedback circuit produces a current that is passed through the coil, producing a force that tends to return the paddle to its neutral (i.e., unrotated) position. The magnitude of the current required to maintain the paddle in its neutral position provides a measure of the acceleration along the sensing axis.

In accelerometers of the type described above, it is generally necessary to mount a capacitor plate and a coil on at least one of the paddle surfaces. It is therefore usually desirable to maximize the area of the paddle surface for a given sized instrument. To accomplish this, the support ring surrounding the paddle is often made thin in a radial direction, to thereby maximize paddle area. Use of a relatively thin support ring also facilitates the use of certain stress isolation techniques. For example, the support ring may be clamped between the mounting members only along a section of the support ring remote from the flexures, thereby minimizing the amount of clamping stress transmitted to the flexures.

The means provided for connecting the mounting members to one another, such that they clamp the support ring, is an important feature of accelerometer design. In one known approach, the mounting members and proof mass assembly form a cylindrical sandwich structure, and are held together by a tight fitting cylindrical band that extends around the sandwich structure, and that contacts the mounting members without contacting the proof mass assembly. This "belly band" approach has the advantage that it does not require fastening elements to pass through the proof mass assembly, and thereby avoids problems with interference between the fastening elements and the paddle, sensing means and force rebalancing means.

A disadvantage of the bellyband design is that it is difficult to concentrate the clamping force on a particular section of the support ring. As described above, it may be desirable to exert all or a preponderance of the force along one side of the support ring, to avoid coupling stress into the flexures. However, bolts or other fastening members have generally not been passed between the mounting members through the proof mass assembly, because the radial thinness of the support ring would require such fastening members to pass through the paddle itself, thereby interfering with the sensing and/or force rebalance system. In addition, bolts passing through the paddle would present contamination problems, resulting from small particles trapped in the threads formed in the mounting members above and below the paddle.

In light of the above, there is a need for a fastening system for an accelerometer of the type described above, that permits tailoring of the clamping force, but that does not result in interference or contamination problems.

SUMMARY OF THE INVENTION

The present invention provides an accelerometer for measuring acceleration along a sensing axis. The accelerometer comprises a proof mass assembly that includes a paddle, a support, and suspension means for suspending the paddle from the support such that the paddle can move along the sensing axis in response to acceleration. The accelerometer also includes sensing means for detecting movement of the paddle away from a null position, and force rebalance means for exerting a force on the paddle, to maintain the paddle in its null position. The sensing means comprises a capacitor plate positioned on a surface of the paddle.

The proof mass assembly is clamped between upper and lower mounting means positioned on opposite sides of the proof mass assembly from one another. A fastening means is provided for holding the mounting members together, the fastening means including at least one fastening member extending between the upper and lower mounting members through the proof mass assembly. The support is shaped so as to form an opening through which the fastening member passes, such that the support isolates the fastening member from the paddle.

In a preferred embodiment, the support comprises a support ring extending around the paddle, and the suspension means comprises one or more flexures extending between a central area of the support ring and the paddle. The support ring includes a clamped portion remote from the central area, and an unclamped portion that includes the central area. The opening through which the fastening member passes is in the clamped area of the support ring. In a further preferred aspect, the fastening means comprises first and second fastening members extending through first and second openings in the support ring.

DETAILED DESCRIPTION OF THE PREFERRED EMBODIMENT

Figure 1:
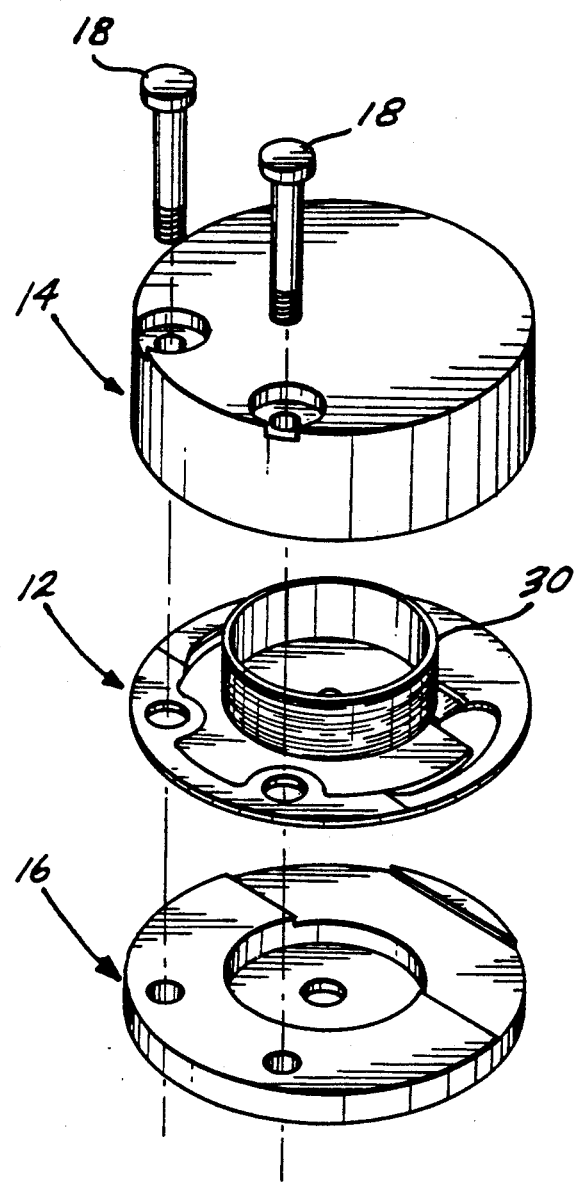
FIG. 1 is an exploded perspective view of an accelerometer according to the present invention.

FIGS. 1-5 illustrate an accelerometer according to a preferred embodiment of the invention. Referring initially to FIG. 1, the accelerometer comprises proof mass assembly 12 that is clamped between stator 14 and plate 16. The proof mass assembly, stator and plate are held together by two bolts 18. The entire structure is then typically mounted within a case (not shown) that permits the accelerometer to be secured to a structure whose acceleration is to be measured.

Figure 2:
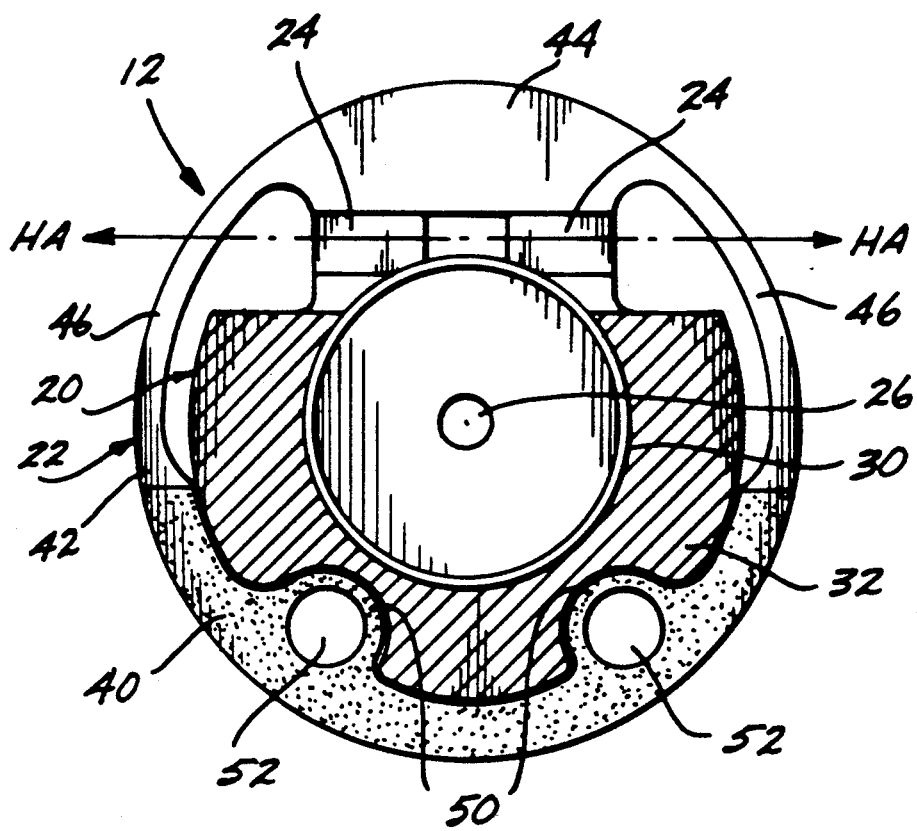
FIG. 2 is a plan view of the proof mass assembly of the accelerometer of FIG. 1.
Figure 3:
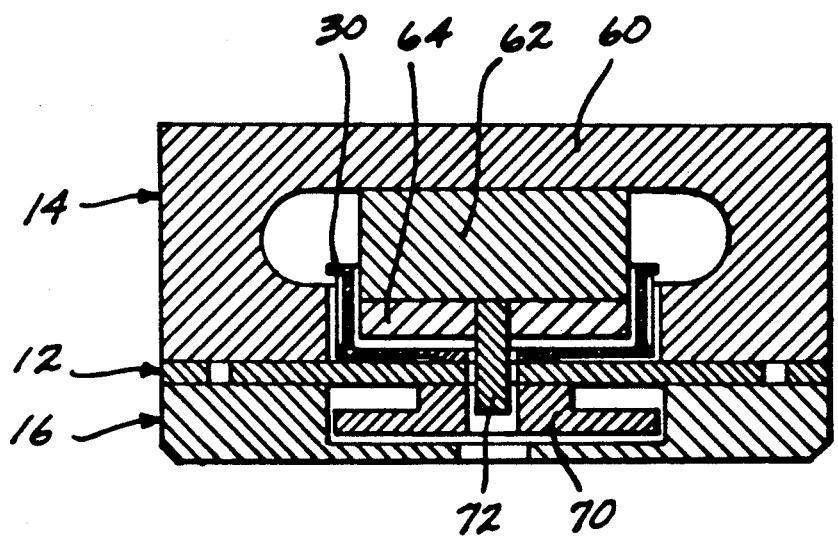
FIG. 3 is a cross-sectional view of the accelerometer of FIG. 1.

Referring now primarily to FIG. 2, proof mass assembly 12 comprises paddle or proof mass 20 that is mounted to support ring 22 by flexures 24. The paddle includes a center opening 26 through which a pin extends, as further described below. The flexures permit the paddle to rotate with respect to support ring 22 about hinge axis HA that passes through the flexures. The paddle, flexures and support ring are preferably formed as a unitary structure, for example by etching a wafer of amorphous quartz. Coil 30 is mounted on paddle 20, as shown in FIGS. 1-3, and includes a central opening that is substantially coincident with opening 26. The area of paddle 20 radially outward from coil 30 includes capacitor plate 32 that forms a part of the sensing circuit for detecting paddle position.

Support ring 22 comprises clamped portion 40 and unclamped portion 42. Clamped portion 40 includes inwardly extending bulges 50 in which openings 52 are formed. Openings 52 permit bolts 18 to pass through the proof mass assembly, but maintain isolation between the bolts and the paddle, as described hereinafter. Clamped portion 40 is thicker than unclamped portion 42, such that when proof mass assembly 12 is secured between stator 14 and plate 16, the stator and plate contact the support ring only at clamped portion 40. Due to its reduced thickness, unclamped portion 42 is suspended between the stator and plate, but does not contact these structures. Unclamped portion 42 includes central area 44 to which flexures 24 are attached, and arms 46 that connect the central area to clamped portion 40.

Referring now primarily to FIG. 3, stator 14 comprises magnetic circuit assembly 60, magnet 62 and pole piece 64. Coil 30 occupies a cylindrical gap between the magnetic circuit assembly and the pole piece. When electrical current is passed through the coil, the magnetic field produced by the current in the coil interacts with the magnetic field of magnet 62, to produce an upward or downward force on the coil, and therefore on the paddle. The lower surface of the paddle includes counterweight 70 that is provided to counterbalance the coil. Pin 72 is mounted in pole piece 64, and extends downwardly through opening 26 in the paddle, and through aligned openings in the coil and counterweight. The pin limits the lateral motion of paddle 20, and thereby prevents damage to the flexures when the accelerometer is subjected to large lateral shocks.

Figure 4:
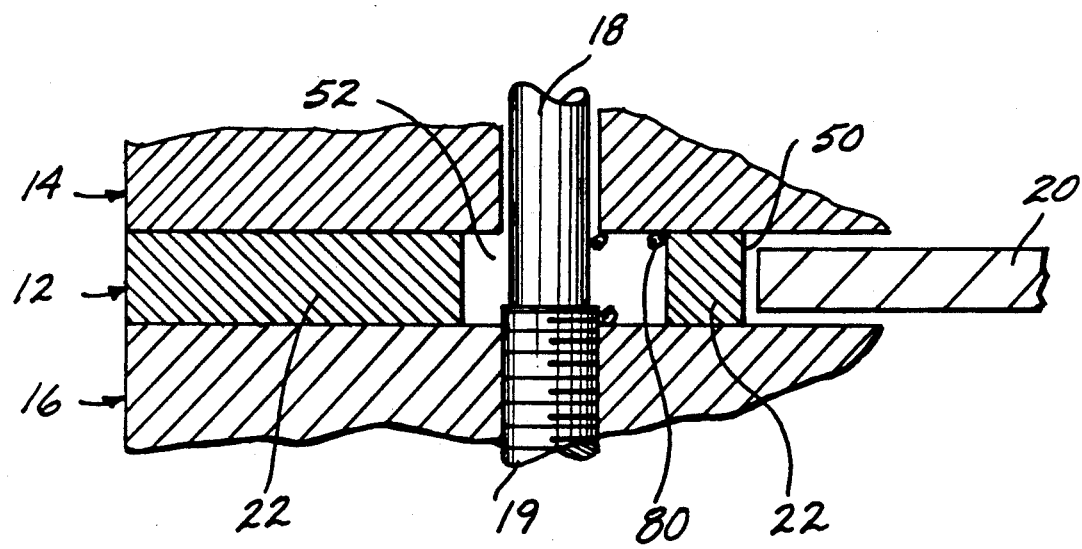
FIG. 4 is a partial cross-sectional view showing the bolt passing through the support according to the present invention.

FIG. 4 presents a cross section of the assembled accelerometer in the vicinity of one of bolts 18. Bolt 18 includes a threaded portion 19 that is received within a matching threaded opening within plate 16. It is to be noted that the bolt is completely surrounded by support ring 22 in its passage through the proof mass assembly, thereby isolating the bolt from the paddle. The significance of this feature is that during installation of the bolts through the stator, proof mass assembly and plate, contamination particles 80 consisting of scrapings of metal, quartz, and/or particulate contamination will natrually accumulate in the gap between the stator and plate. Absent the isolation provided by the present invention, such contaminants would have an easy migration path to the paddle. Contamination particles in the region of the paddle can cause bias errors, saturated output failure, and short/erratic travel of the paddle. In addition, the presence of such contaminants may or may not show up immediately, depending upon how they migrate across the gap and into the path of the paddle.

The fact that portions of support ring 22 completely surround bolt 18 also means that the compression forces exerted by the bolt on the support ring, via the stator and plate, are evenly spread about the portions of the support ring bordering opening 52. This provides for an even application of clamping force to the support ring, and reduces the possibility of unbalanced forces traveling to the flexures and causing bias errors. In addition, the even support provided by support ring 22 minimizes distortion of stator 14 and plate 16 caused by the bolts. In the illustrated embodiment, distortion of stator 14 would change the distance between capacitor plate 32 on paddle 20 and the corresponding capacitor plate (not shown) on the lower surface of the stator. Such distortion will produce a bias error in the accelerometer output. Even for a design which includes a second capacitor formed between a capacitor plate on the lower surface of the paddle and plate 16, the distance changes caused by distortion of the stator and plate will in general not match one another, and bias error will therefore appear in this case as well. Finally, the degree of distortion of stator 14 and/or plate 16 caused by the bolts may be subject to variation caused by thermal or mechanical changes. Such variations will change the distance between the capacitor plates, resulting in bias instability.

Figure 5:
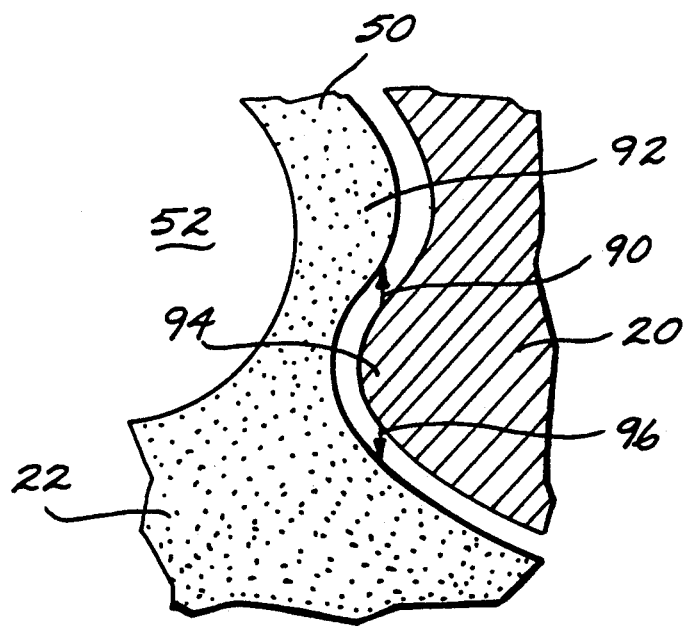
FIG. 5 is a partial view illustrating a technique for limiting paddle movement normal to the hinge axis.

A further aspect of the preferred embodiment is illustrated in the enlarged view of FIG. 5. In the vicinity of opening 52, paddle 20 and support ring 22 have hook-shaped profiles, such that movement of paddle 20 along direction 90 towards the hinge axis is limited by interference between feature 92 of the support ring and feature 94 of the paddle. Movement of paddle 20 away from the hinge axis, symbolized by arrow 96, is also limited by this support. The maximum permitted travel along directions 90 and 96 is a function of the geometry of the hook-shaped region, and the gap between the paddle and support ring, and may be adjusted to provide an appropriate shock stop clearance. When using this feature in conjunction with a relatively narrow paddle-support ring gap, the need for pin 72 may be eliminated.

Figure 6:
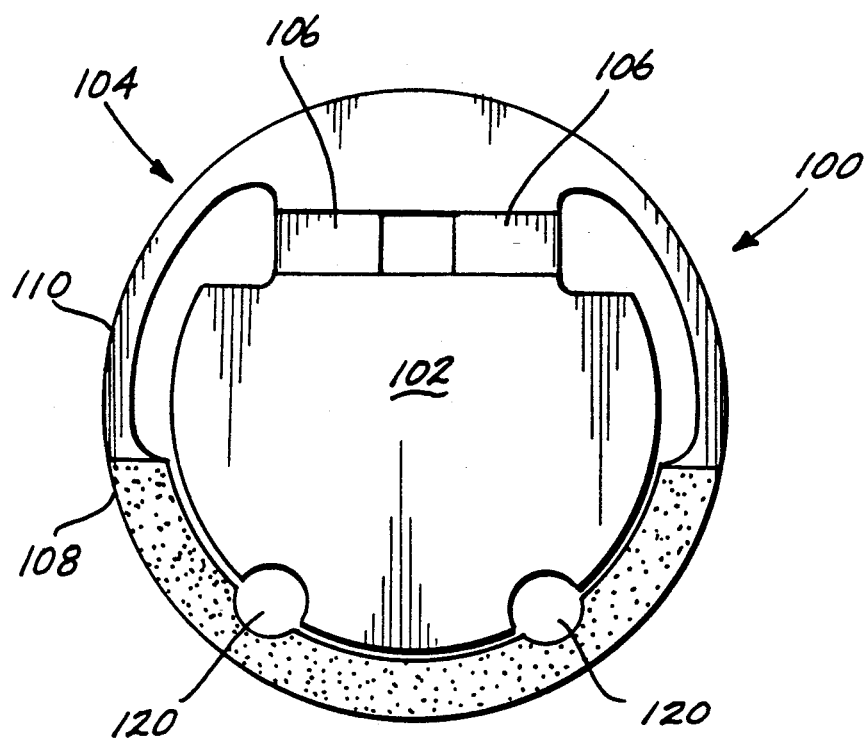
FIG. 6 is a plan view of an accelerometer that does not include the improvement of the present invention.
Figure 7:
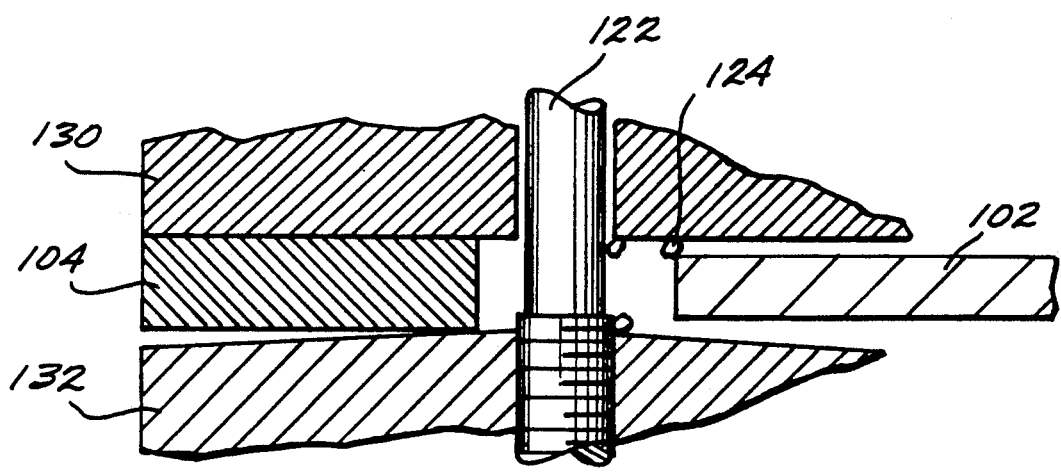
FIG. 7 is a partial cross-sectional view of the accelerometer of FIG. 6, not including the present invention.

For purposes of comparison, FIGS. 6 and 7 sets forth a generally similar accelerometer structure, but without utilizing the present invention. In this arrangement, proof mass assembly 100 comprises paddle 102 supported from support ring 104 by flexures 106, the support ring again comprising a supported portion 108 and an unsupported portion 110. The bolts pass through openings 120 formed from opposed indentations in paddle 102 and in portion 108 of the support ring. As a result, as shown in FIG. 7, bolt 122 is not isolated from paddle 102, allowing contamination particles 124 to migrate into positions adjacent to the paddle, thereby potentially interfering with paddle movement and with accelerometer functioning. In addition, the clamping force exerted by bolt 122 is received by support ring 104 along only one side of the bolt, thereby leading to pinching of the inner edge of the support ring, and to distortion of stator 130 and plate 132, resulting in bias errors and bias instability as previously described.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. An accelerometer for measuring acceleration along a sensing axis, the accelerometer comprising:
   a proof mass assembly including a paddle, a support, and suspension means for suspending the paddle from the support such that the paddle can move along the sensing axis in response to acceleration along the sensing axis;
   sensing means for detecting movement of the paddle away from a null position, the sensing means comprising a capacitor plate positioned on a surface of the paddle;
   force rebalance means for exerting a force on the paddle to maintain the paddle in said null position;
   upper and lower mounting members positioned on opposite sides of the proof mass assembly from one another; and
   fastening means for holding the mounting members together such that the mounting members clamp the support between them, the fastening means including at least one fastening member extending between the upper and lower mounting members through the proof mass assembly;
   the support being shaped so as to form an opening through which the fastening member passes such that the support isolates the fastening member from the paddle, wherein the fastening means comprises, first and second fastening members extending between the upper and lower mounting members through the proof mass assembly, the support being shaped to form first and second openings through which the respective first and second fastening members pass such that the support isolates each fastening member from the paddle, wherein the support comprises a support ring extending around the paddle, said support ring having a clamped portion clamped between the mounting members and an unclamped portion, and wherein the suspension means comprises one or more flexures extending between the unclamped portion of the support ring and the paddle, the flexures permitting the paddle to rotate with respect to the support ring about a hinge axis normal to the sensing axis, wherein said openings extend through the clamped portion and wherein the openings are formed in bulges in the support ring, each bulge comprising a section in which the support ring is radially thicker than in adjacent sections of the support ring.

2. The accelerometer of claim 1, wherein the bulges and the adjacent areas of the paddle are shaped so as to limit movement of the paddle with respect to the support ring in a direction towards the hinge axis.

3. An accelerometer for measuring acceleration along a sensing axis, the accelerometer comprising:
   a proof mass assembly including a paddle, a support, and suspension means for suspending the paddle from the support such that the paddle can move along the sensing axis in response to acceleration along the sensing axis;
   sensing means for detecting movement of the paddle away from a null position;
   upper and lower mounting members positioned on opposite sides of the proof mass assembly from one another; and
   fastening means for holding the mounting members together such that the mounting members clamp the support between them, the fastening means including at least one fastening member extending between the upper and lower mounting members through the proof mass assembly;
   the support being shaped so as to form an opening through which the fastening member passes such that the support isolates the fastening member from the paddle, wherein the support comprises a support ring extending around the paddle, said support ring having a clamped portion clamped between the mounting members and an unclamped portion and a bulge formed in the clamped portion comprising a section in which the support ring is radially thicker than in adjacent sections of the support ring, and wherein the suspension means comprises a flexure extending between the unclamped portion of the support ring and the paddle, the flexure permitting the paddle to rotate with respect to the support ring about a hinge axis normal to the sensing axis, wherein said opening extends through the bulge in the clamped portion formed in the support ring.

4. The accelerometer recited in claim 3, wherein the bulge is shaped to engage the paddle and limit the travel of the paddle in a direction transverse to the sensing axis to prevent damage to the flexure when the accelerometer is subjected to shock transverse to the sensing axis.

5. The accelerometer recited in claim 4, wherein said bulge has a hook-shaped profile that engages a hook-shaped profile formed in the paddle to limit travel of the paddle.

6. The accelerometer recited in claim 5 further including a second hook-shaped bulge formed in said supporting ring.

7. The accelerometer recited in claim 4, wherein said bulge and said paddle have interlocking profiles.

8. The accelerometer recited in claim 1, wherein the bulges are shaped to engage the paddle and limit the travel of the paddle transverse to the sensing axis to prevent damage to the flexure when the accelerometer is subjected to shock transverse to the sensing axis.

9. The accelerometer recited in claim 8, wherein said bulges have hook-shaped profiles that engage hook-shaped profiles formed in the paddle to limit travel of the paddle.

10. The accelerometer recited in claim 8, wherein said bulges and said paddle have interlocking profiles.

* * * * *